US008366320B2

(12) United States Patent
Vogelgesang

(10) Patent No.: US 8,366,320 B2
(45) Date of Patent: Feb. 5, 2013

(54) RUNNING ROLLER CARRIAGE OF A RUNNING ROLLER GUIDE

(75) Inventor: Christian Vogelgesang, Kirkel (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 195 days.

(21) Appl. No.: 12/412,473

(22) Filed: Mar. 27, 2009

(65) Prior Publication Data

US 2009/0245700 A1   Oct. 1, 2009

(30) Foreign Application Priority Data

Mar. 29, 2008 (DE) .................. 10 2008 016 400

(51) Int. Cl.
*F16C 19/00* (2006.01)
*F16C 33/10* (2006.01)

(52) U.S. Cl. .......................................... 384/58; 384/13

(58) Field of Classification Search ................ 384/13, 384/50, 52, 53, 54, 56, 58; 184/3.1, 9, 17, 184/36, 46, 65, 100
See application file for complete search history.

(56) References Cited

U.S. PATENT DOCUMENTS

| | | | | |
|---|---|---|---|---|
| 236,958 A * | 1/1881 | Rochelle | | 184/65 |
| 759,699 A * | 5/1904 | Graves | | 184/65 |
| 1,165,215 A * | 12/1915 | Tate | | 184/65 |
| 1,452,775 A * | 4/1923 | Bacon | | 184/65 |
| 1,883,148 A * | 10/1932 | Warr | | 184/3.1 |
| 2,022,726 A * | 12/1935 | Leach | | 184/3.1 |
| 2,077,077 A * | 4/1937 | Stern | | 184/3.1 |
| 2,155,005 A * | 4/1939 | Brooks | | 384/13 |
| 2,273,698 A * | 2/1942 | Ellis | | 408/61 |
| 3,004,802 A * | 10/1961 | Maurer et al. | | 384/53 |
| 3,132,719 A * | 5/1964 | Cole | | 184/65 |
| 3,402,574 A * | 9/1968 | Hauptman | | 464/63.1 |
| 3,985,404 A * | 10/1976 | Plaza et al. | | 384/13 |
| 3,998,497 A * | 12/1976 | Koizumi | | 384/53 |
| 4,245,719 A * | 1/1981 | Frank | | 184/3.1 |
| 4,638,761 A * | 1/1987 | Carrick | | 118/694 |
| 4,715,730 A * | 12/1987 | Magnuson | | 384/52 |
| 4,815,863 A * | 3/1989 | Forster | | 384/49 |
| 5,368,128 A * | 11/1994 | Waldchen | | 184/15.2 |
| 5,435,649 A * | 7/1995 | Kuwahara | | 384/13 |
| 5,474,384 A * | 12/1995 | Ludwig et al. | | 384/57 |
| 5,678,927 A * | 10/1997 | Yabe et al. | | 384/13 |
| 5,735,214 A * | 4/1998 | Tsuboi | | 105/29.1 |
| 5,772,333 A * | 6/1998 | Yabe et al. | | 384/13 |
| 5,915,840 A * | 6/1999 | Zaguroli et al. | | 384/53 |
| 6,125,968 A * | 10/2000 | Shirai | | 184/5 |
| 6,155,717 A * | 12/2000 | Michioka et al. | | 384/15 |
| 6,250,804 B1 * | 6/2001 | Hsu et al. | | 384/13 |
| 6,290,394 B1 * | 9/2001 | Obara et al. | | 384/13 |
| 6,401,867 B1 * | 6/2002 | Michioka et al. | | 184/5 |

(Continued)

*Primary Examiner* — Justin Krause

(74) *Attorney, Agent, or Firm* — Lucas & Mercanti, LLP; Klaus P. Stoffel

(57) ABSTRACT

A running roller carriage of a running roller guide. The running roller carriage has a carrying body and two running roller pairs which are formed by running rollers. The two running rollers of a running roller pair are arranged one behind the other in the running directions of the running roller carriage, and have a lubricating element which is arranged between the two running rollers of a running roller pair and is in lubricating contact with the running roller pair. The lubricating element has an absorbent lubricating body which is received in a receiving groove which is formed on the carrying body The receiving groove is configured for holding the lubricating body and for transferring lubricant onto the lubricating body.

6 Claims, 2 Drawing Sheets

U.S. PATENT DOCUMENTS

| | | | |
|---|---|---|---|
| 7,121,723 B2* | 10/2006 | Wei et al. | 384/45 |
| 7,465,094 B2* | 12/2008 | Wei et al. | 384/44 |
| 7,556,430 B2* | 7/2009 | Wu et al. | 384/13 |
| 7,870,935 B2* | 1/2011 | Yatsushiro et al. | 184/9 |
| 7,918,604 B2* | 4/2011 | Fleisch et al. | 384/58 |
| 2002/0097926 A1* | 7/2002 | Mochizuki | 384/58 |
| 2004/0234176 A1* | 11/2004 | Sattler et al. | 384/13 |
| 2006/0140519 A1* | 6/2006 | Fournier | 384/58 |
| 2006/0215943 A1* | 9/2006 | Agari et al. | 384/13 |
| 2008/0080795 A1* | 4/2008 | Kuwabara et al. | 384/13 |
| 2008/0159668 A1* | 7/2008 | Wu et al. | 384/13 |
| 2009/0252442 A1* | 10/2009 | Michioka et al. | 384/13 |
| 2010/0247004 A1* | 9/2010 | Suzuki et al. | 384/13 |

\* cited by examiner

RUNNING ROLLER CARRIAGE OF A RUNNING ROLLER GUIDE

This application claims the priority of DE 10 2008 016 400.3 filed Mar. 29, 2008, which is incorporated by reference herein.

FIELD OF THE INVENTION

The present invention relates to a running roller carriage of a running roller guide.

BACKGROUND OF THE INVENTION

DE 10 2006 031 704 A1, for example, has disclosed a running roller guide, in which a running roller carriage is mounted such that it can be displaced longitudinally on a guide rail via four rollers, The carrying body of the running roller carriage has two running roller pairs which are formed in each case by two running rollers, the guide rail being arranged between said two running roller pairs. The two running rollers of each running roller pair are arranged one behind the other in the running directions of the running roller carriage. A lubricating element which is in lubricating contact with the running roller pair is arranged between the two running rollers of a running roller pair. The lubricating element is at the same time configured as a relubricating unit. It has a housing with concave housing sections which lie opposite one another as viewed in the longitudinal direction of the guide rail, said concave housing sections being adapted to the outer contour of the running rollers. Said relubricating unit has two lubricating points which are in lubricating contact in each case with one of the two running rollers of the running roller pair. Furthermore, said relubricating unit has two lubricating cushions which are arranged in the housing, each lubricating cushion being provided with one of the lubricating points. A spring which suspends the two lubricating cushions against the two running rollers is arranged between said lubricating cushions. Said lubricating cushions are formed from absorbent material which is impregnated with lubricant, the lubricant being discharged to the running rollers under lubricating contact at the lubricating point.

Said relubricating unit requires a considerable amount of installation space, since the housing has to receive not only the lubricating cushion, but also at the same time the lubricant as lubricant reservoir. Furthermore, the production outlay and the associated increased costs can possibly be disadvantageous for low-cost applications.

SUMMARY OF THE INVENTION

It was therefore an object of the invention to specify a running roller carriage of a running roller guide, which is inexpensive and simple to provide. According to the invention, the object is achieved by the running roller carriage where a lubricating body of the lubricating element is received in a receiving groove which is formed on the carrying body. Unlike in the prior art, a separate housing is no longer required in order to secure the lubricating body. Rather, a simple recess in the carrying body is sufficient, into which the lubricating body can be clamped, for example. In addition, the receiving groove of the running roller carriage according to the invention serves to transfer lubricant to the lubricating body. A separate lubricant reservoir outside the carrying body can be omitted without a replacement, since the relubrication of the lubricating body can take place via said receiving groove. Furthermore, the running roller carriage experiences a weight reduction as a result of the recess, which weight reduction can be advantageous in certain applications.

Lubricant can be introduced into the receiving groove in a simple way by said receiving groove being connected to a recess, in particular a hole, which is provided in the carrying body. Lubricant which has accumulated in said recess can pass from there via the receiving groove onto the lubricating body. The lubricating body is capable of receiving lubricant and discharging it again at lubricating points. Porous, absorbent materials can be suitable here.

A felt body may be particularly suitable as the lubricating body, which felt body can be clamped, for example, into the receiving groove in a simple way on account of its solid, but nevertheless absorbent structure. The recess in the carrying body which is preferably configured as a hole can end at a lubricating nipple which is attached to an end face of the carrying body. Thus, for example, lubricant can be pumped into the hole by way of a lubricant pump which is connected to the lubricating nipple, said hole serving at the same time as lubricant reservoir. As a result of the fact that the recess at the same time contributes to a considerable weight saving of the carrying body, the running roller carriages according to the invention can be suitable, in particular, for applications, in which a low inherent weight is demanded.

BRIEF DESCRIPTION OF THE DRAWINGS

In the following text, the invention will be explained in greater detail using an exemplary embodiment which is depicted in a total of four figures, in which.

DETAILED DESCRIPTION OF THE INVENTION

Figure 1:
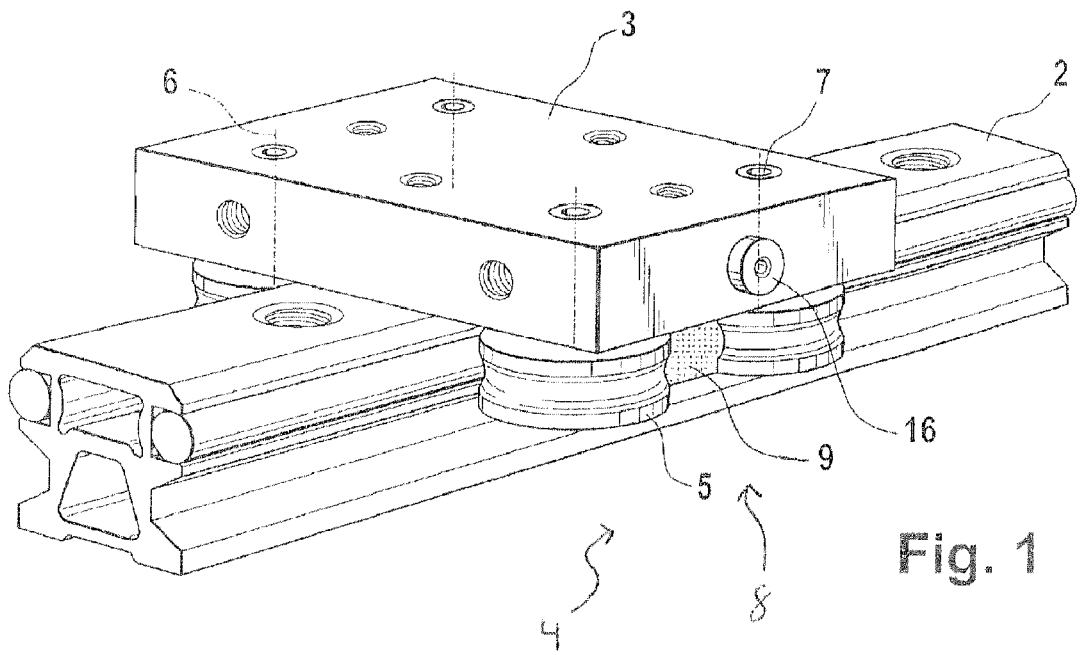
FIG. 1 shows a guide carriage according to the invention of a running roller guide, in a perspective illustration.

FIG. 1 shows a perspective illustration of a running roller carriage 1 according to the invention which is mounted such that it can be displaced longitudinally on a guide rail 2. The running roller carriage 1 and the guide rail 2 form a running roller guide. The running roller carriage 1 has a carrying body 3 and two running roller pairs 4 which are arranged on both longitudinal sides of the guide rail 2. The two running rollers 5 of a running roller pair 4 are arranged one behind the other in the running directions of the running roller carriage 1. The running rollers 5 are arranged such that they can be rotated about a running roller axis 6. Each running roller 5 is screwed to the carrying body 3 via a threaded bolt 7. A lubricating element 8 is arranged between the two running rollers 5 of a running roller pair 4. The lubricating element 8 comprises a lubricating body 9 which is in lubricating contact with the two running rollers 5 of the running roller pair 4.

Figure 2:
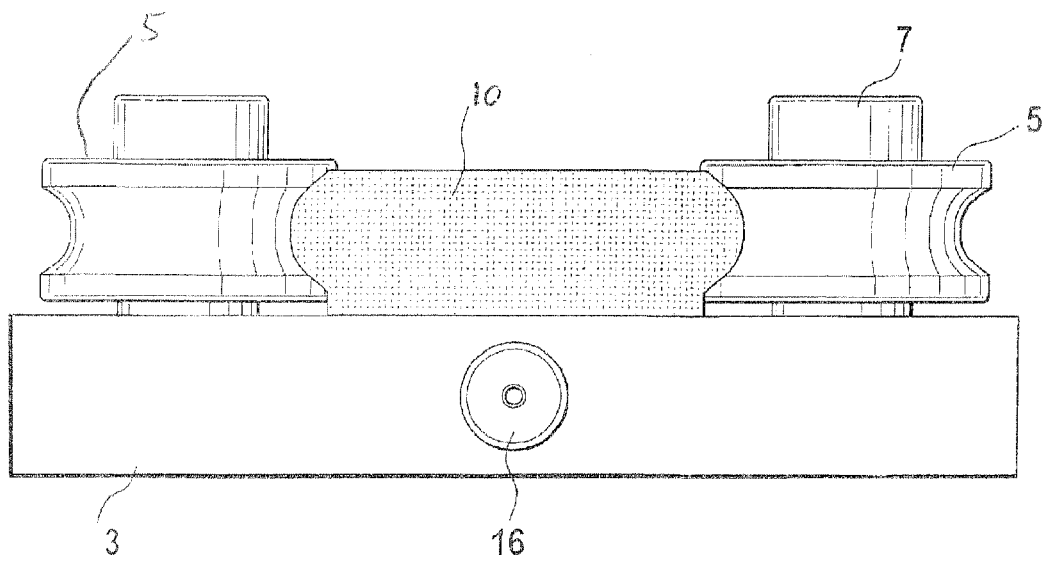
FIG. 2 shows a side view of the guide carriage according to the invention.

FIG. 2 shows a side view of the running roller carriage 1. The lubricating body 9 is configured in the present case as felt bodies 10 which are produced from felt. It can be gathered from the Figure that the felt body 10 is adapted on its sides which face the two running rollers 5 to the circumferential face of the running rollers 5. The felt body 10 is filled with lubricant which is discharged onto the circumferential face of the running rollers 5, preferably during rotation of the running rollers 5.

Figure 3:
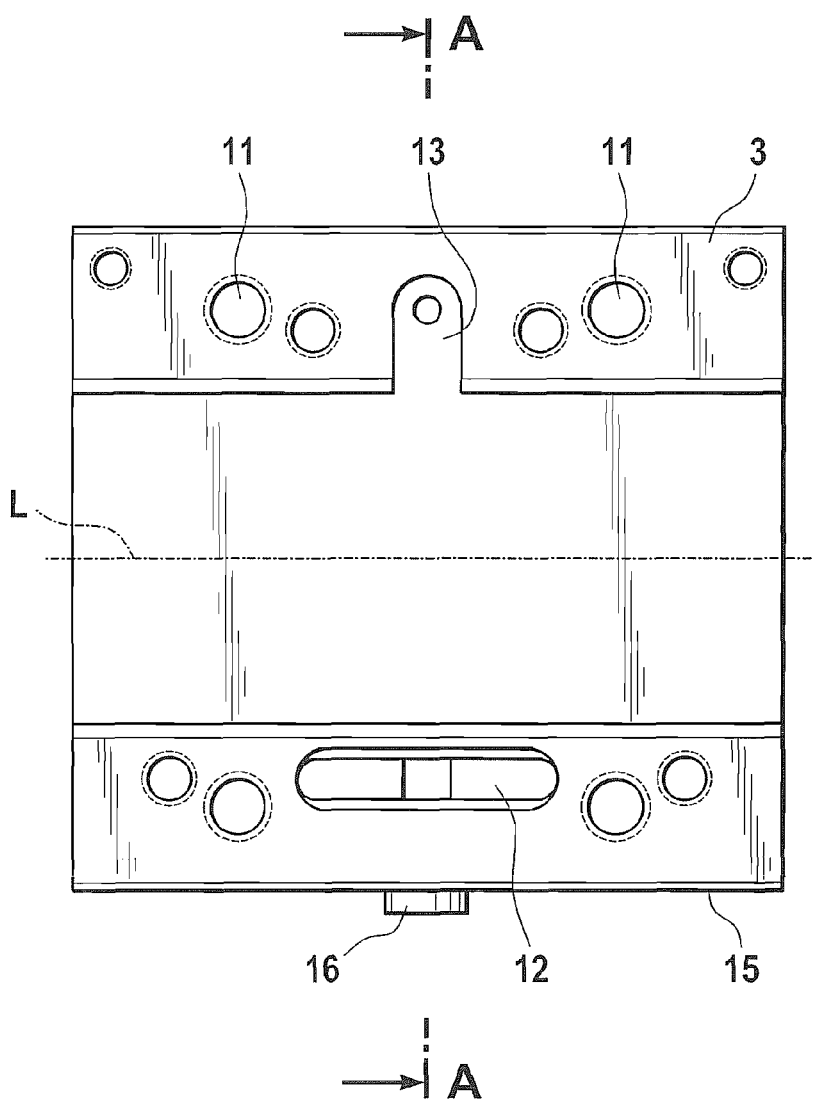
FIG. 3 shows the carrying body of the guide carriage in a view from below.
Figure 4:
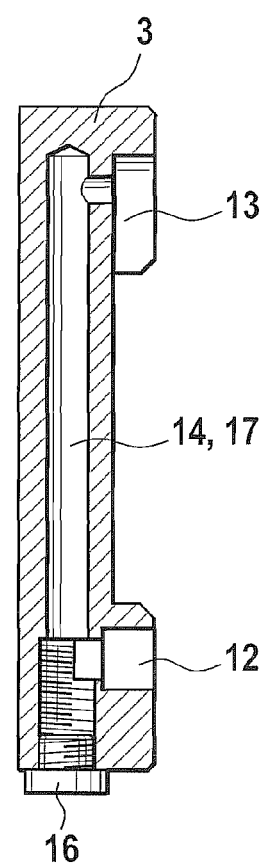
FIG. 4 shows a section along the line A-A from FIG. 3.

FIGS. 3 and 4 show the carrying body 3 of the running roller carriage 1 with FIG. 3 reproducing the view of the carrying body 3 from below. Illustrated in FIG. 3, are threaded holes 11 for the threaded bolts 7 (not depicted here). Receiving grooves 12, 13 are provided on both sides of the longitudinal axis L of the carrying body 3 for receiving lubricating elements or lubricating bodies (not depicted here). Two variants of receiving grooves 12, 13 are depicted here. The receiving groove 12 which is depicted below the longitudinal axis L extends along the longitudinal axis L. Said receiving groove 12 is dimensioned in such a way that the felt body 10 which is depicted in FIG. 2 can be inserted without difficulty into the receiving groove 12 and can be secured in the latter. The felt body 10 can be secured positively, or else (as here) non-positively. Accordingly, the lubricating body 10 is clamped into the receiving groove 12.

The receiving groove 13 which is depicted above the longitudinal axis L extends substantially transversely with respect to the longitudinal axis L of the running roller carriage 1. A lubricating element according to this invention can also be fitted here.

The carrying body 3 is provided with a hole 14 which is arranged transversely with respect to the longitudinal axis L and is configured in the present case as a blind hole. At one end face 15 of the carrying body 3, the hole 14 ends in a lubricating nipple 16. The lubricating nipple 16 can also be seen in FIGS. 1, 2 and 4.

The two receiving grooves 12, 13 are connected to the hole 14, as can be gathered from FIG. 4. The hole 14 serves at the same time as lubricant reservoir 17, from which lubricant passes into the receiving grooves 12 and 13. The lubricating elements (lubricating bodies in the present case) which are inserted in the receiving grooves 12 and 13 get saturated with the lubricant and then discharge the latter onto the running rollers, with which the lubricating body is in lubricating contact.

The felt body 10 can also be held on the carrying body 3 by a screw (not depicted here). At any rate, it is ensured that sliding or falling of the felt body out of the carrying body 3 is avoided. The carrying body 3 can be provided with a plurality of holes which communicate with one another, with the result that an enlarged lubricant reservoir is formed, with the advantageous effect of an increased service life without relubrication being required.

LIST OF DESIGNATIONS

1 Running roller carriage
2 Guide rail
3 Carrying body
4 Running roller pair
5 Running roller
6 Rotational axis
7 Threaded bolt
8 Lubricating element
9 Lubricating body
10 Felt body
11 Threaded hole
12 Receiving groove
13 Receiving groove
14 Hole
15 End face
16 Lubricating nipple
17 Lubricant reservoir
L Longitudinal axis

The invention claimed is:

1. A running roller carriage of a running roller guide rail, comprising:
   a carrying body having receiving grooves;
   at least two pairs of running rollers fixed to the carrying body, the running rollers of each of the pairs of running rollers arranged one behind another and linearly spaced from each other in a longitudinal direction on each side of the guide rail, in a running direction of the roller carriage; and
   a lubricating element, which has a lubricating body, arranged in each of the receiving grooves, the receiving grooves aiding in transferring lubricant onto the lubricating body and the lubricating element arranged between the running rollers of each of the pairs of running rollers in the running direction of the roller carriage such that the lubricating element is in lubricating contact with each of the running rollers forming each running roller pair.

2. The running roller carriage of a running roller guide according to claim 1, wherein each of the running rollers are fixed to the carrying body by a bolt.

3. The running roller carriage of a running roller guide according to claim 1, wherein the lubricating element is a felt body, which has a contour, held in the receiving groove and the contour of the lubricating element is in lubricating contact with each of the running rollers of the pairs of running rollers.

4. The running roller carriage of a running roller guide according to claim 1, wherein the carrying body has a recess to which the receiving groove is connected and from the recess lubricant passes via the receiving groove onto the lubricating body.

5. The running roller carriage of a running roller guide according to claim 4, further comprising a lubrication nipple, wherein the carrying body has an end face and the lubricating nipple is arranged on the end face of the carrying body and the recess extends to the lubrication nipple.

6. The running roller carriage of a running roller guide according to claim 4, wherein the recess is a lubricant reservoir.

* * * * *